US008679432B2

(12) United States Patent
Sanchez-Molinero et al.

(10) Patent No.: US 8,679,432 B2
(45) Date of Patent: Mar. 25, 2014

(54) ADSORBER HAVING INNER COATING

(75) Inventors: Ivan Sanchez-Molinero, Houston, TX (US); Serge Moreau, Houston, TX (US)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 13/809,571

(22) PCT Filed: Jul. 5, 2011

(86) PCT No.: PCT/FR2011/051603
§ 371 (c)(1),
(2), (4) Date: Jan. 10, 2013

(87) PCT Pub. No.: WO2012/007673
PCT Pub. Date: Jan. 19, 2012

(65) Prior Publication Data
US 2013/0115155 A1 May 9, 2013

(30) Foreign Application Priority Data
Jul. 16, 2010 (FR) ...................................... 1055784

(51) Int. Cl.
*B01D 53/50* (2006.01)
*B01D 53/56* (2006.01)
*B01D 53/74* (2006.01)

(52) U.S. Cl.
USPC ..... 423/210; 423/220; 423/239.1; 423/242.1; 422/168; 422/177; 422/241; 96/243; 95/231; 95/232; 95/235; 95/236

(58) Field of Classification Search
USPC ............ 423/239.1, 242.1, 220, 210; 422/168, 422/177, 241; 96/243; 95/231, 232, 235, 95/236
See application file for complete search history.

(56) References Cited

U.S. PATENT DOCUMENTS

| 3,515,520 A * | 6/1970 | Hervert ......................... 422/241 |
| 3,849,179 A * | 11/1974 | Morningstar ............... 206/524.6 |
| 4,166,536 A * | 9/1979 | Roberts et al. ............. 206/524.3 |
| 2004/0101448 A1 | 5/2004 | Yuichi et al. |
| 2005/0180902 A1 * | 8/2005 | Fraser et al. .................. 422/241 |

FOREIGN PATENT DOCUMENTS

FR 2908328 5/2008
GB 2189409 10/1987

OTHER PUBLICATIONS

PCT/FR2011/051603, International Search Report, Sep. 16, 2011.

* cited by examiner

*Primary Examiner* — Timothy Vanoy
(74) *Attorney, Agent, or Firm* — Elwood L. Haynes

(57) ABSTRACT

The invention relates to an adsorber, including a reaction chamber, an adsorbent having adsorption properties enabling the at least partial removal of water from a gas stream including NOx and/or SOx, and a coating essentially consisting of a polymer material on at least a portion of the inner metal wall of the reaction chamber, said polymer being resistant to the acidic liquids at temperatures above 150° C.

12 Claims, 2 Drawing Sheets

ADSORBER HAVING INNER COATING

CROSS-REFERENCE TO RELATED APPLICATIONS

This application is a §371 of International PCT Application PCT/FR2011/051603 filed Jul. 6, 2011, which claims §119 (a) foreign priority to French patent application 1055784, filed Jul. 16, 2010.

FIELD OF THE INVENTION

The invention relates to an adsorber including an adsorbent for at least partially drying a gas, and including a coating for protecting said column from hot acidic liquids capable of temporarily forming during use and to a method for purifying a feed gas stream containing $CO_2$ and water, and at least one impurity selected from NOx and SOx, employing said adsorption column.

BACKGROUND

The gases to be treated, resulting from the oxycombustion of fossil fuels, contain compounds of the NO, $NO_2$, $SO_2$, $SO_3$, $H_2O$, CO, $CO_2$, $O_2$, Ar and $N_2$ type.

The presence in this type of gas of traces of so-called acidic gases of $NO_2$ or $SO_2$ type in the gas phase does not pose particular problems with regard to the corrosion of materials. Indeed, those skilled in the art are able to make among ordinary steels a suitable choice of the quality to be accepted according to the operating conditions. In the presence of water vapor, there are neither problems of corrosion, above the dew point. Carbon steel, for example, can be accepted if the conditions are favorable.

On the contrary, the treatment of fluids containing acidic liquids, of nitric acid and/or sulfuric acid type, in particular at temperatures above room temperature, presents corrosion problems.

FIG. 1 shows that the weight loss rates of steel by corrosion in the presence of acidic solutions are high, and that they strongly increase with temperature.

In this case, it is known to use special "ultra-pure" steels with very strict chemical composition specifications, in particular with respect to compounds such as carbon or phosphorus. The disadvantage of these materials is that they are relatively unavailable and are much more expensive than ordinary steels. Steel able to resist such conditions is, for example, 304 NAG, whose price is from three to five times greater than that of ordinary steel.

Hereinafter, the term "ordinary steel" will be used in contrast to these special steels. Among ordinary steels, for example, mention may be made of carbon steel and type 304 or 316L stainless steels.

Another solution consists in coating the adsorber's inner wall with enamel.

This operation is costly and the coating thus obtained is fragile (poor impact strength).

Nevertheless, one or the other solution is used when hot acidic liquids are continuously present.

The drying of gases of the type, for example, resulting from oxycombustion as cited above, in a TSA (temperature swing adsorption) type adsorption method, corresponds to a specific new type of corrosion risk.

Although only gases containing traces of impurities (NOx, SOx) in vapor form are treated, hot acidic liquids can be formed in the adsorber but, and this is what is particular, only in a localized manner and for limited periods of time.

Indeed, the simultaneous adsorption of water and acidic gases leads to the formation of acidic compounds, for example by the following reactions, notably in the presence of oxygen:

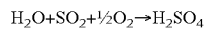
$H_2O+SO_2+\frac{1}{2}O_2 \rightarrow H_2SO_4$

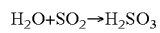
$H_2O+SO_2 \rightarrow H_2SO_3$

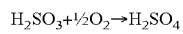
$H_2SO_3+\frac{1}{2}O_2 \rightarrow H_2SO_4$

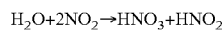
$H_2O+2NO_2 \rightarrow HNO_3+HNO_2$

$2HNO_2 \rightarrow H_2O+NO+NO_2$

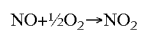
$NO+\frac{1}{2}O_2 \rightarrow NO_2$

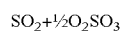
$SO_2+\frac{1}{2}O_2 SO_3$ and other reactions including the change of sulfur and nitrogen to higher degrees of oxidation, or to dismutations. These reactions take place preferably in the adsorbent because of the concentration encountered, and lead to the formation of an acidic aqueous phase.

The acidic phase can be stabilized by interaction with the adsorbent, for example by hydrogen bonds, which leads to its gas-phase formation reaction being accelerated and shifted.

It is also of note that the adsorbents can catalyze certain redox reactions, which means that relatively nonadsorbable gaseous substances can also be sensitive to the presence of adsorbents. The catalytic effects depend on the adsorbent and its surface properties: Si—OH groups, Al—OH groups, cations, organic functional groups (acids, alcohols, ketones, lactones, aldehydes), surface defects. Different adsorbents can thus have different properties: activated carbon, zeolites, silica gels, activated or calcined alumina. For a single type of adsorbent, there are also significant variations resulting from its preparation, its chemical composition and its porous structure.

It must be noted that the strong acids thus generated, and especially sulfuric acid, are relatively non-volatile and are hygroscopic. Thus, these acids will accumulate during cycles because the regeneration conditions specific to the drying methods using adsorption are not sufficient to desorb them entirely.

Due to their low volatility, traces of elements can lead to the accumulation of acids that do not immediately come to mind. For example, traces of phosphorus compounds can lead to the formation of stable and relatively nonvolatile phosphoric acid ($H_3PO_4$). The list of these acidic compounds can be established from the boiling points found in the tables.

The acids formed may possibly be neutralized by bases present in the gas, and lead to corrosive salts, such as chlorides or phosphates.

Regeneration of the adsorbent by a hot, generally dry, gas utilizes counterflow desorption of the adsorbed water, which then will pass over the zone impregnated with the strong acids accumulated previously. Under these conditions, the hot regeneration gas loaded with moisture will condense part of the water it contains on these hygroscopic acidic compounds.

This will lead to an acidic solution that will fill the porosity of the adsorbent, until an excess aqueous phase is formed. This aqueous and highly acidic phase will be in contact with the adsorbers' walls, indeed will even end up by streaming. Then, the heat front passing, these liquids will essentially vaporize and/or will be found at room temperature.

The hot regeneration gas exiting the bed of adsorbent will be found periodically saturated with water and acidic vapors which will condense on the bottom of the colder adsorber. Here as well, hot acidic liquids will be present cyclically.

Consequently, a problem that arises is to limit the corrosion of adsorbers during TSA drying of a feed gas stream including at least water, SOx and NOx, without having to use the expensive solutions that prevail in the continuous presence of acids in liquid form and at high temperature.

SUMMARY OF THE INVENTION

A solution of the invention is an adsorber including:
a reaction chamber,
an adsorbent having adsorption properties enabling the at least partial removal of water from a gas stream including NOx and/or SOx, and
a coating essentially comprising a polymer material on at least a portion of the inner metal wall of the reaction chamber, said polymer being resistant to acidic liquids at temperatures above 150° C., preferably above 200° C.

DETAILED DESCRIPTION OF THE INVENTION

Figure 1:
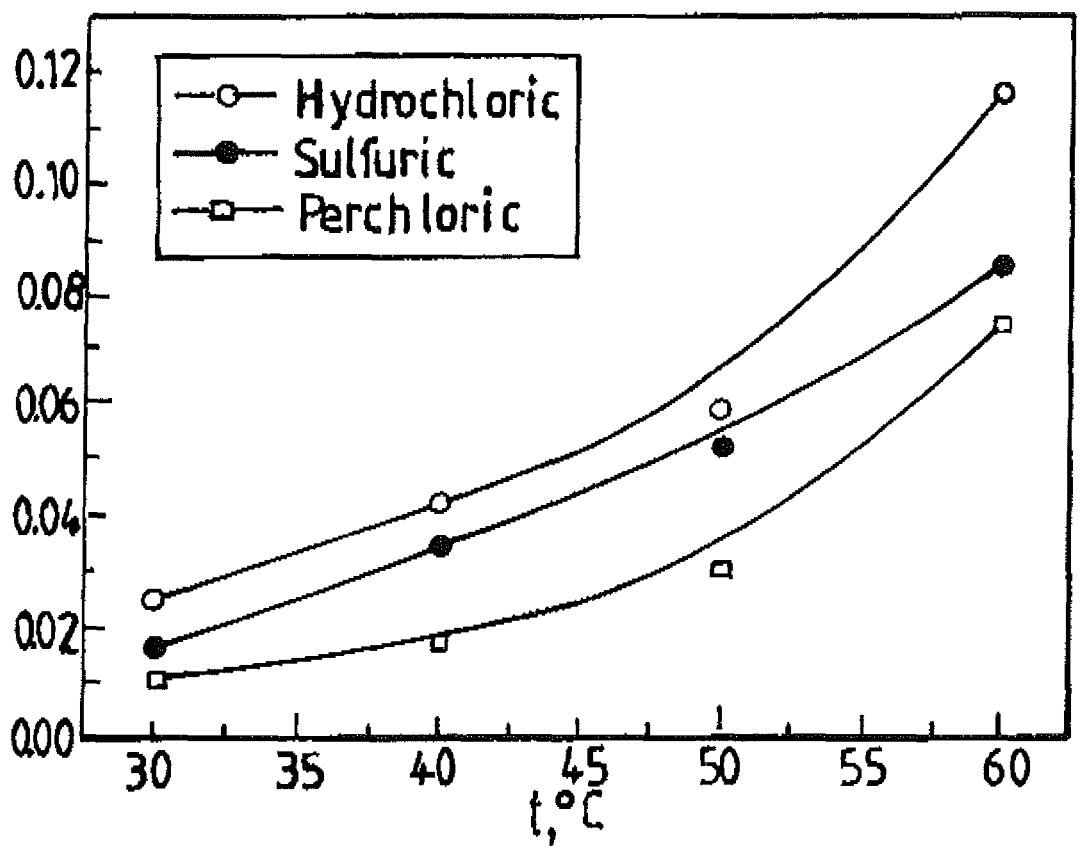
FIG. 1 shows that the weight loss rates of steel by corrosion in the presence of acidic solutions are high, and that they strongly increase with temperature.

The expression "adsorption properties of an adsorbent enabling the preferential removal of a constituent" refers to the fact that the adsorbent has an adsorption capacity at equilibrium and adsorption kinetics such that it is possible to essentially remove this constituent of a gas stream and as a result to purify at least partially said gas stream from this constituent.

The term "acidic liquids" refers to all solutions including acidic compounds resulting from the simultaneous adsorption of water and SOx and/or NOx.

Depending on the case, the adsorber according to the invention may have one or the other of the following characteristics:
the coating is applied to the lower part of the reaction chamber, on the side of the gas stream inflow;
the adsorber includes a reaction chamber including a lower base 2, an upper base 3 and a sheath 1; and an inlet 4 for the gas stream into the reaction chamber; and wherein said coating covers the weld 21 located between the lower base 2 and the sheath 1 and/or the weld 22 located between the lower base 2 and the inlet 4;
said welds 21 and 22 were planed beforehand;
the coating is a fluoropolymer, preferably selected from polytetrafluoroethylene, perfluoroalkoxy and perfluoro (ethylene-propylene); these three fluoropolymers will be grouped under the name "Teflon";
the walls of the reaction chamber are made of standard stainless steel, preferably of type 316L or 304L steel;
the adsorbent material consists of silica gel or zeolites that are resistant to acids, preferably of the mordenite, ferrierite, erionite or offretite type.

The adsorber is preferably an adsorber of TSA (temperature swing adsorption) type.

To apply the coating, the Teflon is projected cold onto at least a portion of the inner wall of the sheet-metal component of the reaction chamber and then the unit is heated at a temperature between 330 and 400° C. The thickness of the coating after drying is preferably between 40 and 500 microns.

The present invention also has as subject matter a method for purifying a feed gas stream containing $CO_2$, water and at least one impurity selected from SOx and/or NOx, including:
a step of compression of the gas stream up to a pressure between 6 and 50 bar, and
a step of drying and/or purification bringing into play at least one adsorber as claimed in the invention;
said drying and/or purification step being able to take place before, after or during the compression step.

The step of drying and/or purification from other impurities of this gas stream can be carried out by means of an adsorber according to the invention, aimed at eliminating:
water, so as to have a water content of the treated gas stream below 500 ppm of water, preferably below 50 ppm, and more particularly still below 5 ppm, and optionally
at least one other impurity.

This step can be carried out at the pressure at which the gas to be treated is supplied, generally between atmospheric pressure—indeed even at slightly lower pressure due to pressure drops in upstream equipment—and 4 bar absolute. It can also be carried out after compression or upon intermediate exit from a compression step, from 6 to 15 bar absolute, for example.

The method according to the invention preferably includes a step of recovery of a purified gas stream, enriched in $CO_2$, in the liquid, gaseous or supercritical state.

After the recovery step, the gas stream can be:
in the liquid state and stored and/or transported; or
in the supercritical state and transported and/or stored; or
in the gaseous state and transported.

The feed gas stream corresponds preferably to oxycombustion flue gases.
the adsorbent is counterflow regenerated according to the type of method (TSA or VSA or PSA or a combination), by a gas stream at a temperature between 80 and 200° C., preferably between 100 and 180° C.

The term "oxycombustion" refers to combustion during which coal is burned in a nitrogen-poor fluid which can range from pure (>95%) oxygen to a fluid containing the same quantity of oxygen as the air (about 21%) obtained by mixing pure (>95%) oxygen with recycled flue gases rich in $CO_2$.

The adsorbent used can be counterflow regenerated according to the type of method (TSA or VSA or PSA or a combination), by a gas stream at a temperature between 80 and 200° C., preferably between 100 and 180° C.

The invention will now be described in greater detail using FIGS. 2 and 3.

Figure 2:
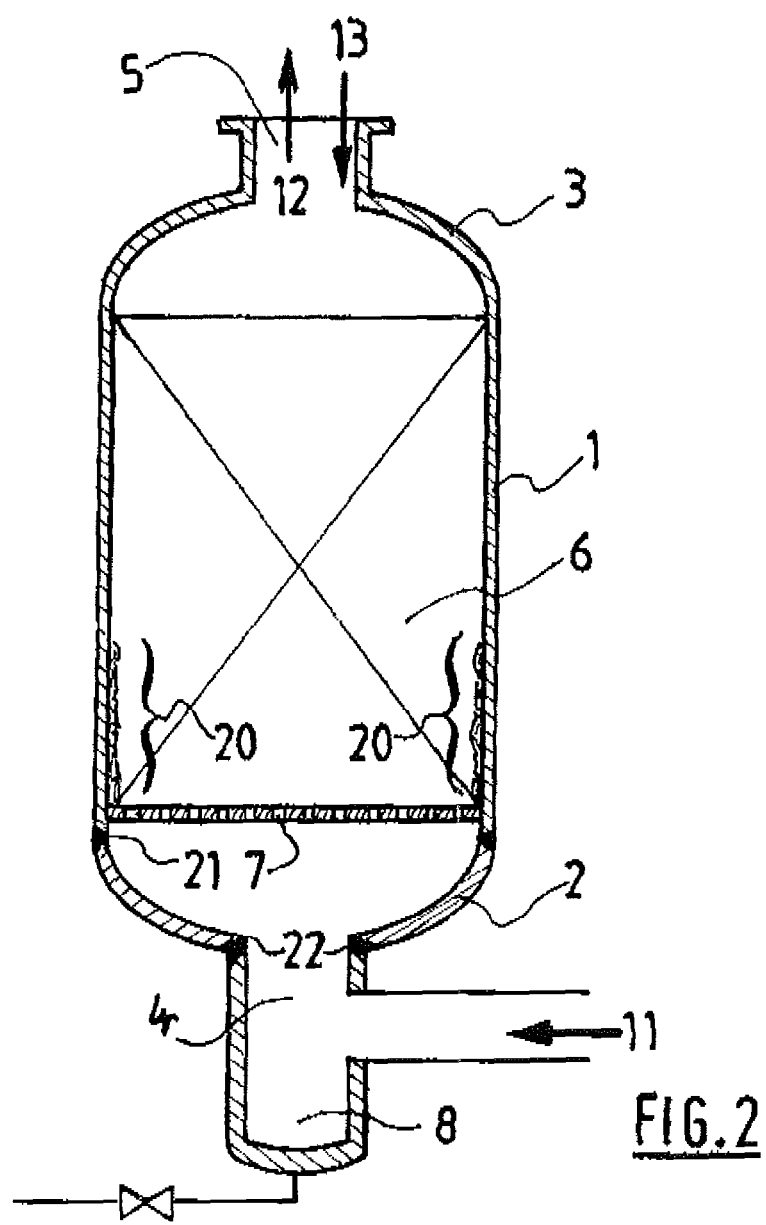
FIG. 2 represents an adsorber according to the invention.

FIG. 2 represents an adsorber according to the invention. The adsorber consists of a sheath 1, a lower base 2 and an upper base 3, an inlet 4 for the gas to be dried and an outlet 5 for the purified gas. The bed of adsorbent 6 is supported by a grill 7. The inlet 4 can have a bleedable low point 8.

The gas to be treated 11 enters the lower part of the adsorber via the inlet 4 and the purified gas 12 exits the upper part via the outlet 5. During the regeneration step, the regeneration gas 13 enters the upper part and leaves the adsorber from the lower part.

The operating conditions in the adsorption phase range from atmospheric pressure—indeed even a slightly lower pressure—to about 60 bar, and from a temperature of about 5° C. up to 50° C. In the regeneration phase, a temperature level generally between 100 and 300° C., preferably between 150 and 250° C., is used.

The regeneration pressure can range from atmospheric pressure to several tens of bar depending on the overall method in which said purification is inserted.

Any liquids can be recovered at the low point 8. During the phase in which the zone of adsorbent loaded with water is regenerated, a liquid phase loaded with acid can appear in the lower part 21 of the adsorber's wall, at the level of the support grill 7 and on the wall of the lower base 2 of the adsorber.

The lower part of the adsorber includes welds, such as those making the junction 21 between the sheath 1 and the lower base 2 or the junction 22 between said bottom and the inlet 4.

These welds constitute the weak link of the adsorber with respect to corrosion problems. According to the invention, they will be protected by a Teflon coating. In greater detail, the welds will be planed, will undergo a surface treatment (for example washing, sanding, microsanding, blowing), Teflon will be applied along the length and the adsorber or the parts thus united heated adequately (baking, for example, by passing through the furnace). The welds are planed to obtain the flattest possible surfaces in order to avoid any risk of microaccumulation of liquid. The final choice of the coating, preferably a fluoropolymer, and preferably still polytetrafluoroethylene (PTFE), perfluoroalkoxy (PFA), or fluoroethylene-propylene (FEP), will be made according to the operating conditions, in particular the maximum temperature that the Teflon coating will have to tolerate.

The protection of the welds represents the minimum protection. It may be advantageous to also protect the zone 20 which cyclically encounters aggressive liquids. More precisely, an extra thickness against corrosion can be opted for to take into account the duration during which this zone is subjected to contact with hot acidic liquids. Generally, two adsorbers are used, one in adsorption and the other in regeneration. Regeneration includes at least one heating phase and one cooling phase. In practice, the most aggressive conditions occur only during a fraction of the warming step, generally less than one quarter of the time. It can be said that the corrosion conditions are extreme during only 10% to 20% of the cycle time, i.e., for a unit operating continuously, for 10% to 20% of the lifespan of said unit. It is this factor specific to TSA purification that makes it possible to use materials less noble than special steels and coatings less expensive than enamel.

Figure 3:
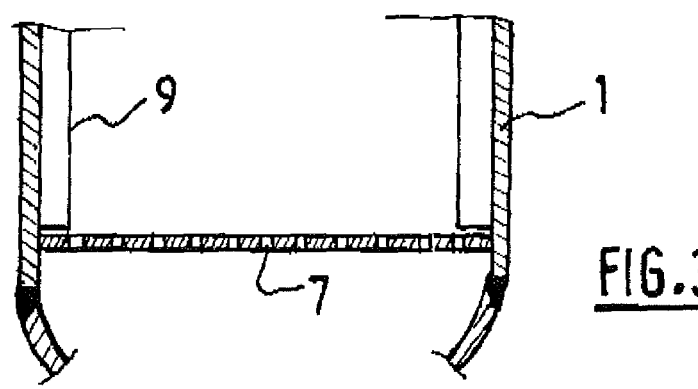
FIG. 3 represents a variation of a part of the adsorber

FIG. 3 represents a variation of a part of the adsorber. Indeed, in this variant, the bed of adsorbent is insulated from the wall 1 of the adsorber by an inner wall 9, for example by a metal blade leaktight on the humid gas inlet side and open on the purified gas side. In this way, this wall is not subjected to pressure and can be easily over-designed in terms of its thickness or, because of its low thickness, can be envisaged to be made of nobler corrosion-resistant metal.

Figure 4:
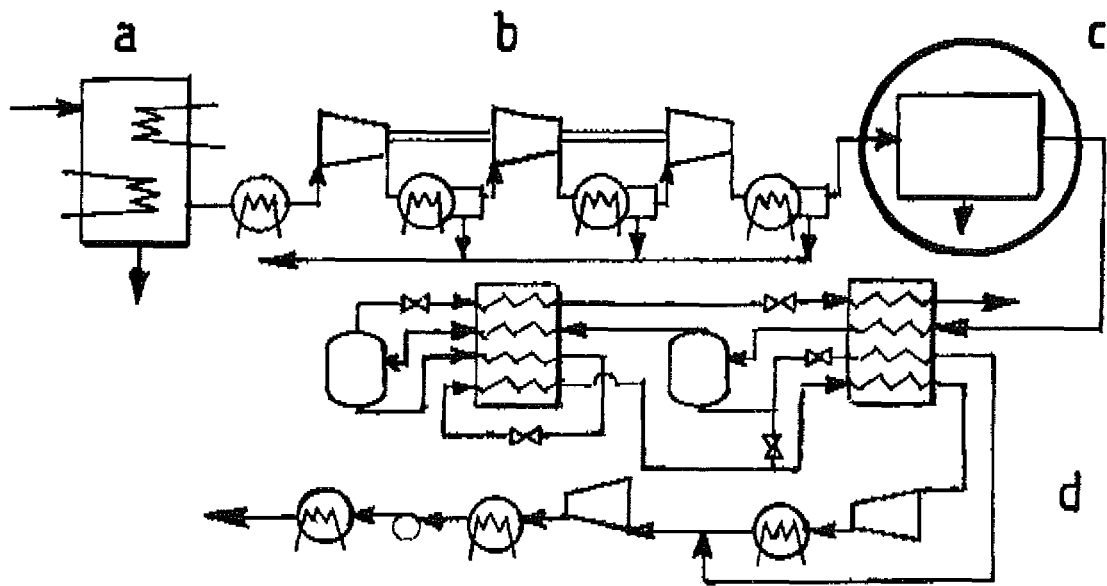
FIG. 4 represents a device for carrying out a method according to the present invention

FIG. 4 represents a device for carrying out a method according to the present invention, characterized by the location of the drying step at the end of the compression cycle.

The method according to the invention may include a first pretreatment step (a) aimed at treating flue gases by using known methods of the state of the art. Current methods include washings that use various liquids (or solvents), such as water, alcohols (methanol for example), amine solutions, basic solutions, etc.; these are the most classic but there are many others of them; or desulfurization units, or filtration units. This first step makes it possible to eliminate an impurity.

The gas resulting from the pretreatment step (a) may contain in general:
a large majority of $CO_2$ (in general greater than 80%);
nitrogen oxides, called NOx, such as NO, $NO_2$, $N_2O_4$, etc.;
sulfur oxides, called SOx, such as $SO_2$, $SO_3$, $H_2SO_4$, etc.;
water to saturation. Indeed, the first step of the treatment methods almost all require that the gas be brought into contact with an aqueous solution;
oxygen at a concentration of several percent (resulting from the excess in relation to the stoichiometry necessary to ensure satisfactory oxycombustion efficiency);
CO (unburned combustion residues);
noncondensables with respect to $CO_2$: nitrogen, argon, oxygen and rare gases coming mainly from the air intakes on the oxycombustion boiler and from the purity of the oxygen;
compounds resulting from heavy metals: $AsCl_3$, AsO, $AsH_3$, AsN; $B(OH)_3$, $HBO_2$, $BH_3$; $BaCl_2$, BaO; $Be(OH)_2$; CdO, CdS, $CdSO_4$, $CdCl_2$; $CoCl_2$, CoO, $Co_2[(CO)_4]_2$; $CuCl_2$, CuCl, CuO, CuH; HgO, $HgCl_2$, $CH_3HgCl$, HgH, HgS, HgSe; MoO, $MoO_2$, $MoO_3$, $MoCl_2$, $Mo(CO)_6$; NiO, $NiCl_2$, $Ni(CO)_4$; $P_2O_5$, $PO_2$, $PCl_3$, $P_4O_6$; $PbCl_2$, PbO, PbS, PbCl; $Sb_2O_3$, SbCl, $SbH_3$, $H_3SbO_4$, $HSbO_3$; SeO, $SeO_2$, $SeO_3$, $H_2Se$, COSe; SnO, SnS, SnH; $SrCl_2$; $V_2O_5$, $V(CO)_4$; $ZnCl_2$, ZnS;
volatile organic compounds (VOCs), and unburned hydrocarbons. the volatile organic compounds are preferably selected from formaldehyde, acetaldehyde, formic acid, acrolein and acetic acid.

Next, during the compression step (b), the gas stream is compressed to a pressure level sufficient to be able on the one hand to separate part of the undesirable compounds in so doing (separators in general located immediately after each compression step followed by heat exchange to cool the gas stream on order to eliminate condensables appearing during this cooling, such as water) and on the other hand to bring the gas under satisfactory conditions (of temperature and pressure) in order to prepare the removal of the other impurities during the following steps.

In one method according to the invention, the third step (c) consists in purifying and drying the compressed stream in an adsorber according to the invention. In this step, water is removed down to a level compatible with the transport and/or liquefaction of $CO_2$ (usually, a dew point between −20 and −50° C., or below). Other constituents can be completely or partially removed from the principal stream, in the same adsorber or in different adsorbers:
nitrogen oxides, called NOx, such as NO, $NO_2$, $N_2O_4$, etc.;
sulfur oxides, called SOx, such as $SO_2$, $SO_3$, $H_2SO_4$, etc.;
$H_2S$, $CS_2$, HCN, HCl, $CHCl_3$, HF;
CO (unburned combustion residues);
compounds resulting from heavy metals: $AsCl_3$, AsO, $AsH_3$, AsN; $B(OH)_3$, $HBO_2$, $BH_3$; $BaCl_2$, BaO; $Be(OH)_2$; CdO, CdS, $CdSO_4$, $CdCl_2$; $CoCl_2$, CoO, $Co_2[(CO)_4]_2$; $CuCl_2$, CuCl, CuO, CuH; HgO, $HgCl_2$, $CH_3HgCl$, HgH, HgS, HgSe; MoO, $MoO_2$, $MoO_3$, $MoCl_2$, $Mo(CO)_6$; NiO, $NiCl_2$, $Ni(CO)_4$; $P_2O_5$, $PO_2$, $PCl_3$, $P_4O_6$; $PbCl_2$, PbO, PbS, PbCl; $Sb_2O_3$, SbCl, $SbH_3$, $H_3SbO_4$, $HSbO_3$; SeO, $SeO_2$, $SeO_3$, $H_2Se$, COSe; SnO, SnS, SnH; $SrCl_2$; $V_2O_5$, $V(CO)_4$; $ZnCl_2$, ZnS;
volatile organic compounds (VOCs), and unburned hydrocarbons. the volatile organic compounds are preferably selected from formaldehyde, acetaldehyde, formic acid, acrolein and acetic acid.

The fourth step (d) then aims to recover a purified gas stream, enriched in $CO_2$. An adsorber according to the present invention can also be implemented at the end of step (a), in order to totally or partially remove the following constituents:

nitrogen oxides, called NOx, such as NO, $NO_2$, $N_2O_4$, etc.;

sulfur oxides, called SOx, such as $SO_2$, $SO_3$, $H_2SO_4$, etc.; $H_2S$, $CS_2$, HCN, HCl, $CHCl_3$, HF;

CO (unburned combustion residues);

compounds resulting from heavy metals: $AsCl_3$, AsO, $AsH_3$, AsN; $B(OH)_3$, $HBO_2$, $BH_3$; $BaCl_2$, BaO; Be $(OH)_2$; CdO, CdS, $CdSO_4$, $CdCl_2$; $CoCl_2$, CoO, $Co_2[(CO)_4]_2$; $CuCl_2$, CuCl, CuO, CuH; HgO, $HgCl_2$, $CH_3HgCl$, HgH, HgS, HgSe; MoO, $MoO_2$, $MoO_3$, $MoCl_2$, $Mo(CO)_6$; NiO, $NiCl_2$, $Ni(CO)_4$; $P_2O_5$, $PO_2$, $PCl_3$, $P_4O_6$; $PbCl_2$, PbO, PbS, PbCl; $Sb_2O_3$, SbCl, $SbH_3$, $H_3SbO_4$, $HSbO_3$; SeO, $SeO_2$, $SeO_3$, $H_2Se$, COSe; SnO, SnS, SnH; $SrCl_2$; $V_2O_5$, $V(CO)_4$; $ZnCl_2$, ZnS;

volatile organic compounds (VOCs), and unburned hydrocarbons. the volatile organic compounds are preferably selected from formaldehyde, acetaldehyde, formic acid, acrolein and acetic acid.

In this case, an adsorber according to the invention would be placed before the compression step (b), or after a partial compression, below 10 bar (a).

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An adsorber comprising:
   a reaction chamber, comprising:
   a lower base,
   an upper base
   a sheath
   walls, wherein said walls comprise an inner side and a lower portion
   an inlet for the gas stream, wherein said inlet is proximate to the lower portion of the wall
   an adsorbent having adsorption properties enabling the at least partial removal of water from a gas stream including NOx and/or SOx, and
   a coating comprising a polymer material on at least a portion of the inner metal wall of the reaction chamber, said polymer being resistant to acidic liquids at temperatures above 150° C.

2. The adsorber of claim 1, wherein coating is applied to the lower part of the reaction chamber, on the side of the gas stream inflow.

3. The adsorber of claim 1 wherein said coating covers a weld located between the lower base and the sheath and/or a weld located between the lower base and the inlet.

4. The adsorber of claim 3, wherein said welds were planed beforehand.

5. The adsorber of claim 1, wherein the coating is a fluoropolymer.

6. The adsorber of claim 5, wherein the coating is selected from polytetrafluoroethylene, perfluoroalkoxy and perfluoro (ethylene-propylene).

7. The adsorber of claim 1, wherein the walls of the reaction chamber are made of standard stainless steel.

8. The adsorber of claim 1, wherein the adsorbent material consists of silica gel or zeolites that are resistant to acids.

9. A method for purifying a feed gas stream containing $CO_2$, water and at least one impurity selected from SOx and/or NOx, comprising:
   compressing the feed gas stream to a pressure between 6 and 50 bar, and
   drying and/or purifiying utilizing at least one adsorber as claimed claim 1;
said drying and/or purifying taking place before, after or during the compression step.

10. The method of claim 9, further comprising recovery of a purified gas stream, enriched in $CO_2$, in the liquid, gaseous or supercritical state.

11. The method of claim 10, wherein after the recovery step, the gas stream is:
   in the liquid state and stored and/or transported; or
   in the supercritical state and transported and/or stored; or
   in the gaseous state and transported.

12. The method of claim 9, wherein the feed gas stream corresponds to oxycombustion flue gases.

* * * * *